United States Patent [19]

Suda et al.

[11] Patent Number: 5,461,517
[45] Date of Patent: Oct. 24, 1995

[54] MAGNETO-RESISTANCE EFFECT TYPE OF RECORDING/REPRODUCING HEAD

[75] Inventors: Mitsuo Suda, Odawara; Kazuo Shiiki, Tsukui; Masanori Tanabe, Odawara; Shinji Narishige, Naka; Eiji Nakanishi, Ashigarashimo; Kouichi Shimizu; Norifumi Miyamoto, both of Odawara; Hirotsugu Fukuoka, Hitachioota, all of Japan

[73] Assignee: Hitachi, Ltd., Tokyo, Japan

[21] Appl. No.: 183,943

[22] Filed: Jan. 21, 1994

[30] Foreign Application Priority Data

Jan. 22, 1993 [JP] Japan ................................. 5-009228

[51] Int. Cl.⁶ ............................ G11B 5/09; G11B 5/03
[52] U.S. Cl. ................................... 360/53; 360/66
[58] Field of Search ............................ 360/46, 53, 66, 360/113, 121

[56] References Cited

U.S. PATENT DOCUMENTS

| 4,802,033 | 1/1989 | Chi ................................ 360/78.08 |
| 5,301,080 | 4/1994 | Ottesen et al. ..................... 360/113 |

OTHER PUBLICATIONS

JP reference No. 01-263903, Abstract, Jan. 17, 1990.

Primary Examiner—Aristotelis Psitos
Assistant Examiner—W. Chris Kim
Attorney, Agent, or Firm—Fay, Sharpe, Beall, Fagan, Minnich & McKee

[57] ABSTRACT

In a magnetic disk device having a composite head with an induction type of recording head adjacent a magneto-resistance effect type of reproducing head, a read error relief is provided to relieve read errors caused by Barkhausen Noise or Base Line Shift phenomenon inherent to the magneto-resistance effect type of reproducing head. Upon occurrence of a read error, a re-try function is first executed, and a track offset function is executed for relief of the read error. However, if the read error is not relieved after the offset operation and the re-try operation have been performed a predetermined number of times, then a pseudo write-in and/or read current control operation is performed together with the offset operation and/or re-try operation for a predetermined number of times. The control operation varies the magnetic domain structure in the head magnetic film (MR film). The variation of magnetic field and/or read current in the head magnetic film causes the magnetic domain structure of the head magnetic film to be varied, so that the Barkhausen Noise or the Base Line Shift phenomenon are extinguished.

20 Claims, 4 Drawing Sheets

MAGNETO-RESISTANCE EFFECT TYPE OF RECORDING/REPRODUCING HEAD

BACKGROUND OF THE INVENTION

The present invention relates to magnetic recording and reproducing with respect to a magnetic disk device, a magnetic tape device, or the like, which is equipped with a composite head for conducting signal recording through an induction head and conducting signal reproducing through a magneto-resistance effect type of magnetic head, and particularly to reproducing data with error relief.

Read error relief in general involves detection of an error during reading of data, and thereafter repeating the reading with and/or without changing various characteristics of the apparatus to prevent further error, until there is relief from the error, that is until the data is read without error. Read error relief has been proposed to counter an unstable phenomenon inherent to an induction magnetic head, such phenomenon being known as the wiggle phenomenon. The wiggle phenomenon is defined as a phenomenon that manifests itself as waves in the reproduced signal wave form, and is thought by the present inventors to be due to an unstable magnetic domain structure that occurs during the recording operation.

In a magnetic disk device for conducting signal recording and reproducing relative to a magnetic disk, an induction magnetic head is commonly used for both signal recording and signal reproducing. For such a system, error relief is provided with a re-try operation executed when a disk controller (hereinafter referred to as "DKC") determines that a read error has occurred; the re-try operation involves again reading the same portion of the disk repeatedly until the read error is not detected or until a predetermined number of re-tries has been completed. Re-try relief also involves an offset operation, wherein the DKC upon detecting a read error will instruct a positioning circuit to change the positioning of the read head relative to the data track in a direction transverse to the data track. That is, upon receipt of the offset operation instruction from the disk controller, the positioning circuit controls a positioning mechanism to repeat the offset operation (an operation of slightly displacing the head inward or outward in a track-width direction) until a read margin is maximum (the read margin is maximum when the reproduced output is maximum and the read error is minimum).

If the read error cannot be relieved even after using the above re-try operation and offset operation, because of the wiggle phenomenon, the following operation would be conducted. The following operation is based upon a recognition that the wiggle phenomenon occurring in the reproduced wave form is dependent upon the magnetic domain structure of the magnetic head at the time when the write-in operation is conducted. The error relief operation then induces a magnetic flux in the magnetic film of the magnetic head by conducting a predetermined write-in operation. The magnetic flux thus induced varies the unstable state of the magnetic domain structure to a stable state.

The above prior art is effectively used to prevent the wiggle phenomenon from occurring when conducting reading with the induction type of magnetic head, which induction type of magnetic head is commonly used for both signal recording and reproducing in the device. However, for a magnetic disk device in which an induction type of magnetic recording head is used for the recording operation and a magneto-resistance effect type of head (MR head) is used for the reproducing operation, the above mentioned prior art read error relief operation is not effective to a sufficient degree, because the signal recording head and the signal reproducing head are different from each other.

The reproducing operation using the magneto-resistance effect type of head will now be described. Ordinarily, the head magnetic film having the magneto-resistance effect (MR film) conducts its magnetization rotation or crystalline phase change smoothly in accordance with the magnetic field occurring from the magnetic orientation found on the data track of the magnetic disk that is adjacent the head, which causes the electrical resistance of the head magnetic film to be varied corresponding to the variation of the magnetic field produced by the relatively moving data track. The variation of the electrical resistance of the head magnetic film as described above is detected as a voltage variation by supplying a DC read current (bias current) to the magnetic film.

In the magneto-resistance effect type of head, it has been known that the head magnetic film has a magnetic domain structure, and thus phenomena called Barkhausen Noise and Base Line Shift occur. Both phenomena are caused by the behavior of the magnetic domain structure of the head magnetic film, and the wave form of the reproduced signal during the read operation is therefore greatly deformed as a result of such phenomena. The Base Line Shift is defined as a phenomenon characterized in the zero level of the reproduced signal wave form (base line) shifting to a positive or negative side, and this Base Line Shift is considered to be induced due to occurrence of hysteresis caused by a discontinuous motion of the magnetic domain. The Barkhausen Noise, in general, is characterized by noise in the reproduced signal caused by the Barkhausen effect, which is the occurrence of minute jumps in the magnetization of a ferromagnetic or soft magnetic substance as the magnetic field is increased or decreased over a continuous range.

Generally, in order to perform a read operation in a magnetic disk device, a signal pulse is formed for each peak of the reproduced signal wave form, and then the signal pulse is passed through a signal discriminating window to detect data on the basis of the presence or absence of the signal pulse within the signal discriminating window. However, with respect to a reproduced signal wave form having Barkhausen Noise or Base Line Shift, the peak position of the signal is deviated along the time axis and deviated in amplitude. Therefore, the signal pulse produced by detecting a peak is deviated along the time axis relative to the time position of the signal discriminating window, and thus a read error occurs. Also, because of the amplitude deviation, a quasi-peak occurs in the reproduced signal wave form to induce plural and sometimes false signal pulses in the signal discriminating window, and thus a read error occurs.

Densification of the magnetic disk device has happened in the past and will be further promoted in the future. This densification will necessarily cause the signal discriminating window to be further narrowed in the future. Therefore, the possibility that the read error occurs due to Barkhausen Noise or Base Line Shift will be increased further in the future.

SUMMARY

It is an object of the present invention to analyze the prior art with respect to identifying problems, analyzing such problems, and solving such problems. The present invention provides a magnetic recording and reproducing device equipped with a composite head for recording a signal using an induction type of magnetic head and reproducing the signal using a magneto-resistance effect type of head, and includes read error relief from read errors as would have been caused by Barkhausen Noise or Base Line Shift due to the magneto-resistance effect type of head being used in the reproducing.

The device provides instructions for a re-try operation to be repeated a predetermined number of times when a read error is detected, in an effort to relieve the read error and obtain the correct data. Thereafter, particularly when the read error is still present, the device will vary the read current supply to the magnetic film of the magneto-resistance effect type of head under a read current and/or magnetic field control operation as a magnetic domain control during further re-try operations, which control operation will be conducted with the re-try operation a predetermined number of times, with current and/or magnetic field further being varied each time, as a further effort for relieving the read error.

The read current control operation increases or decreases the read current from an initial current value used at the time when the read error occurs. This increase or decrease may be stepwise, and may be towards the positive side or towards the negative side, or first one and then the other, for a predetermined number of re-try operations. The current is further changed for each re-try operation during the read current control operation until relief of the read error is detected or until a predetermined number of read current control operations have been completed, whichever occurs first. After the read current control operations have been completed, the device either holds the new read current at which the read error was relieved so that the new read current is thereafter used for normal reading operation, or the device will return the read current to the initial current value that was being used at the time the read error was first detected, with a choice being based upon designed criteria as the occasion demands. The read current control operation may also supply the read current at an opposite polarity to the polarity employed at the time when the read error was first detected.

Through this control operation, most of the Barkhausen Noise or the Base Line Shift which has occurred in the magnetic domain structure before the use of the read error relief operation is extinguished by the use of the read error relief operation, and thus the read error caused by the Barkhausen Noise or Base Line Shift can be relieved.

In addition to or in place of the variation of the read current supplied to the head magnetic film and during the magnetic disk device read operation, a predetermined pseudo write-in operation may be conducted using the induction type of recording head to induce a write-in magnetic field in the head magnetic film of the magneto-resistance effect type of head adjacent to the induction type of recording head, thereby varying the magnetic domain structure of the head magnetic film of the magneto-resistance effect type of head for extinguishing the Barkhausen Noise or Base Line Shift as described above to relieve the read error.

BRIEF DESCRIPTION OF THE DRAWINGS

Further objects, features and advantages of the present invention will become more clear from the following detailed description of a preferred embodiment, shown in the accompanying drawing, wherein.

DETAILED DESCRIPTION OF A PREFERRED EMBODIMENT

Figure 1:
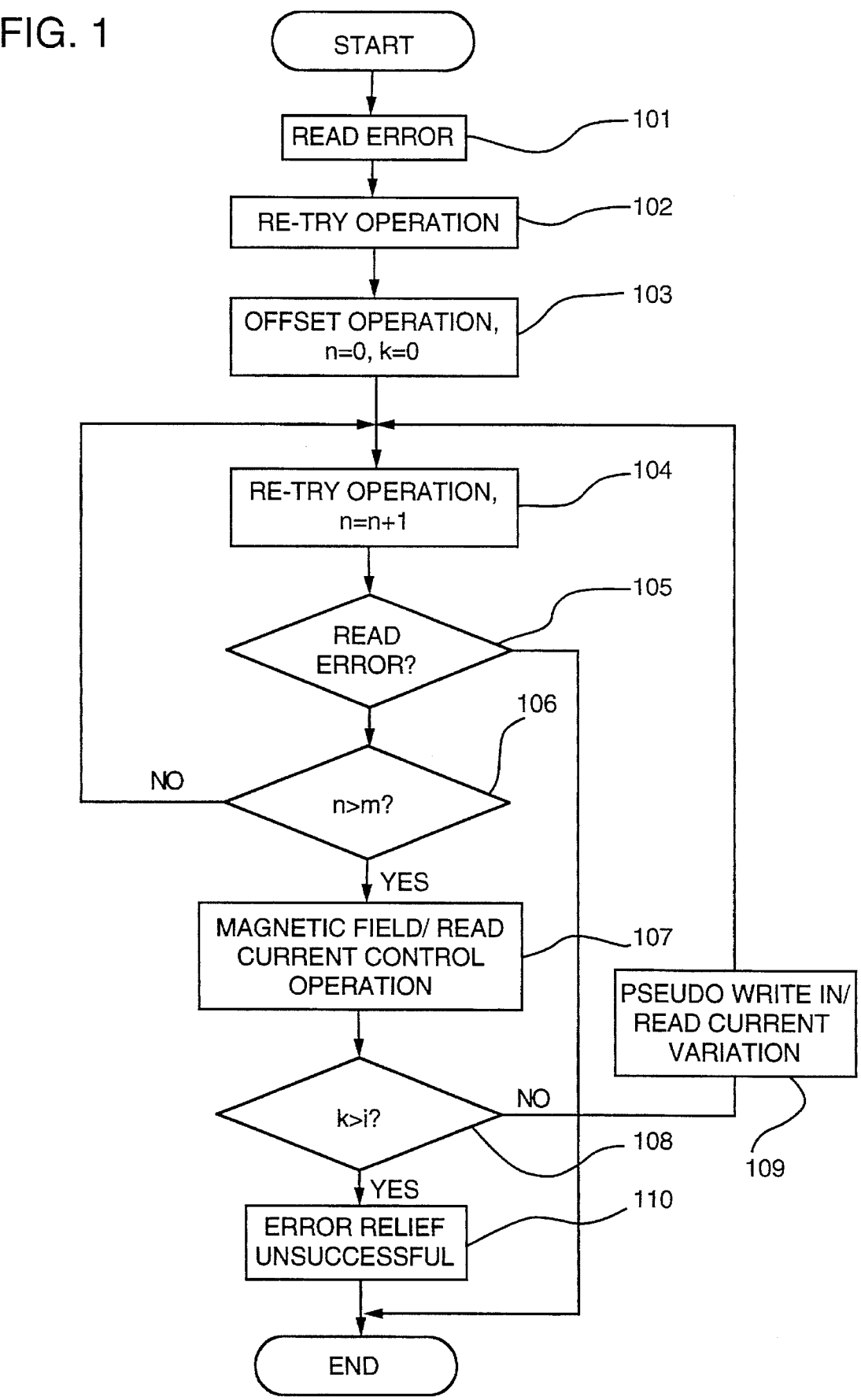
FIG. 1 is a flowchart of a read error relief operation according to an embodiment of the present invention.

FIG. 1 is a flowchart showing the error relief operation of the magnetic disk device of an embodiment according to the present invention.

When a read error is detected, which may be detected by any known means, the processing of FIG. 1 is started in accordance with step 101. In step 102, a re-try operation is conducted, during which the read current remains unchanged from the read current used at the time that the read error was first detected. In FIG. 1, the re-try operation of step 102 and the offset operation of step 103 (which involves offsetting the head and track as mentioned above) occur only once by way of example, without checking to see if the read error has been relieved.

At step 103, variables n, k, are reset to zero. In step 104, the retry operation is conducted. As a part of step 104, variable n is incremented (n=n+1). Step 105 checks to see if the read error has been relieved, and if it has the processing of FIG. 1 ends. If the read error has not been relieved as determined by step 105, step 106 checks to see if variable n is greater than a preset number m, wherein m+1 is equal to the maximum number of times that the offset operation is to be conducted. If n is not greater than m, then the offset operation of step 104 is conducted again to further offset the head and data track. If the offset operation of step 104 has been repeated for m+1 times without relieving the read error, then processing proceeds to step 107. Step 107 conducts a read current control operation, which may include one, two or all three of the read current control operations shown more specifically with respect to their effect upon read current in FIGS. 2, 4 and 5, respectively. First, the read current is changed to a new value in accordance with the read current control operation of step 107 and since k is zero, k will be less than a preset number i, (i+i is the maximum number of times that the read current control operation is to be conducted), and the processing will pass to step 109 that sets the variable n to zero and supplies the new read current to the MR film of the MR head, after which processing returns to step 104, which may also include an offset operation. If the offset and/or re-try operation of step 104 does not relieve the read error, the positioning of the read head and track is incrementally changed throughout the allowable Offset range for n+1 repetitions followed by re-try and then processing again proceeds to step 107, where the read current control operation changes the read current and k is incremented. Therefore, steps 104–109 are repeated for i+1 repetitions or until the read error is relieved as determined by step 105, which ever occurs first, and for each such repetition k, the offset and/or re-try operation of step 104 is conducted m+1 times to pass through the allowable offset range. Thereafter, if the read error has not been relieved after i+1 repetitions of steps 104–109, processing passes to step 110 wherein the error relief operation of FIG. 1 reports that error relief is unsuccessful.

The re-try operation 102, and the combined offset operation and re-try operation of step 103 and step 104 are each per se known, as they have been conducted in the prior art with respect to the read current that existed at the time the error was detected in the prior art. The read current control operation of step 107 resulting in the read current variation of step 109 is novel in accordance with the present invention and shown more fully with respect to one or more of FIGS. 2, 4 and 5, so that all of the steps 104–109 according to the present invention provide read error relief.

Figure 2:
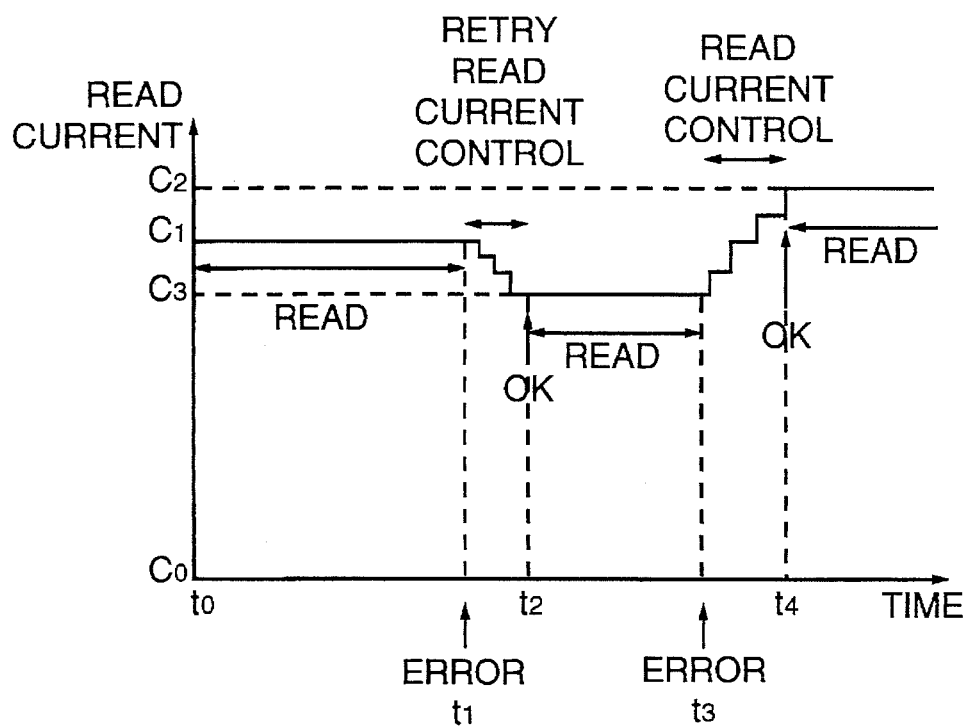
FIG. 2 is a diagram showing the effect that the read current control operation has upon the read current when errors are detected, to relieve the read error, in accordance with one of the steps of FIG. 1.

A process conducted according to FIG. 1, with particular emphasis upon step 104, will be shown for one example in FIG. 2. A conventional read operation is conducted from time $t_0$ to $t_1$ at a read current value $C_1$ for a plurality of data, until a read error is detected in step 101 at time $t_1$. Then steps 102–103 are conducted without relieving the error; thereafter steps 104–109 are conducted for one iteration with the read current reduced one step to a lower value, conducted for another iteration for the read current reduced to a still lower value, and conducted for a third iteration with the read current at a still lower value (the downward steps of the read current being equal), at which time $t_2$ step 105 determines that the read error has been relieved during the last iteration of steps 104–109. From time $t_2$ to time $t_3$, the normal read operation is continued to gather further plural data. At time $t_3$, a different read error is detected at step 101 and the read error relief processing of FIG. 1 is started again. The read error relief processing of FIG. 1 is conducted from time $t_3$ through time $t_4$ in the same manner that it was conducted from time $t_1$ to time $t_2$, except that the step changes of read current are reversed, e.g., in the direction of increasing read current. At time $t_2$, upon relieving the read error detected at time $t_1$, the read current is maintained at its new value $C_3$ during normal read operation from $t_2$ to $t_3$. At the time the second read error was relieved at $t_4$, the read current was maintained at its new value $C_2$ for the normal read operations following $t_4$. The change from stepwise decreasing current in conducting the read error relief processing of FIG. 1 in a current decreasing direction for the period $t_1$–$t_2$ to an increasing direction during the period $t_3$14 $t_4$ can be determined in any manner, for example the decreasing direction is maintained until a fixed lower current value is reached and then the increasing direction is continued, or the directions are alternated for successive iterations of steps 101–109 of the read error relief processing of FIG. 1.

Figure 3:
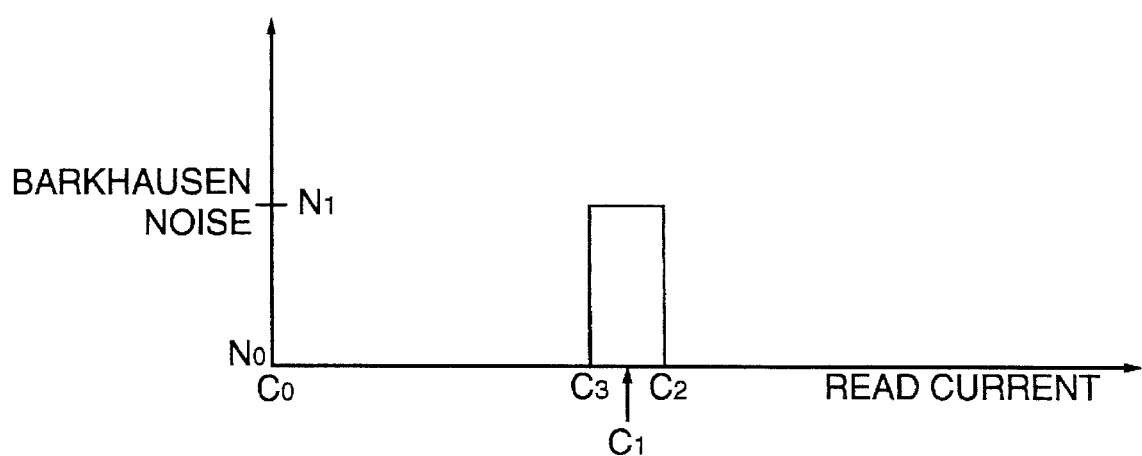
FIG. 3 is a diagram showing a relationship between Barkhausen Noise and the amount of read current wherein the abscissa of FIG. 3 corresponds to the ordinate of FIG. 2.

The read current control operation of the present invention is effective in alleviating Barkhausen Noise, because Barkhausen Noise tends to occur in a specific range of read current. As an example, FIG. 3 shows that Barkhausen Noise effectively does not exist from read current $C_0$ through read current $C_3$, and that is why the read error was relieved in the process shown in FIG. 2 when the read current reached $C_3$ at time $t_2$. In FIG. 3, the Barkhausen Noise exists in the range of read current $C_3$ through read current $C_2$, which includes the read current $C_1$ of FIG. 2 wherein the read error was initially detected at time $t_1$. Further, FIG. 3 shows that the Barkhausen Noise does not exist when the read current is raised to $C_2$, which corresponds to the read current $C_2$ occurring at time $t_4$ in FIG. 2, wherein the read error was relieved.

The analysis of Barkhausen Noise made with respect to FIG. 3 is also generally true for the Base Line Shift phenomenon. That is, read current control operation of steps 104–109 of FIG. 1 is effective in relieving read error because the Barkhausen Noise or Base Line Shift has a characteristic that it occurs at only current values as shown in FIG. 3.

Figure 4:
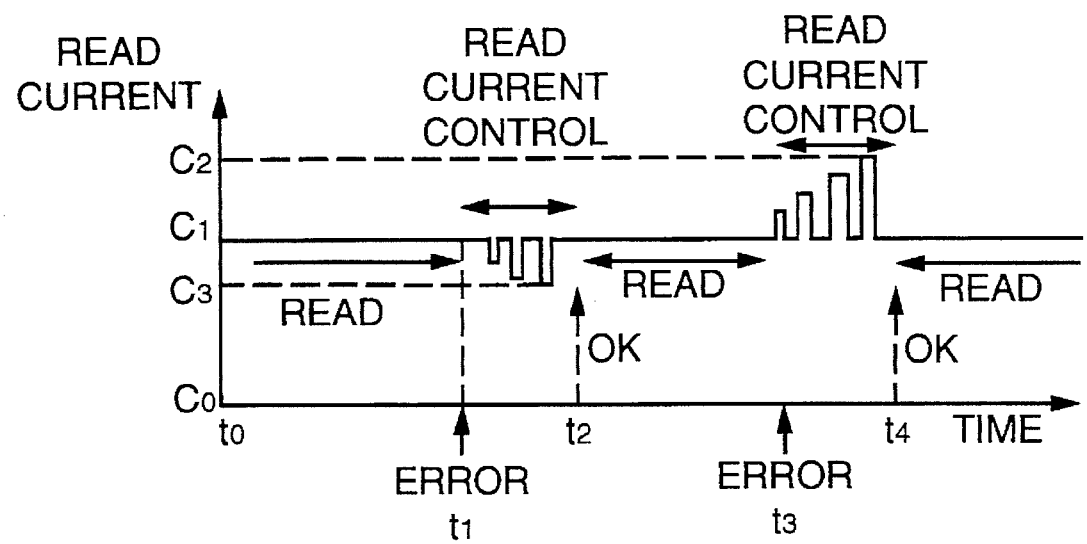
FIG. 4 is a diagram showing another example of read current control operation conducted upon detecting errors to relieve the read error.

Next, another example of the read current control operation of steps 107–109 will be shown with respect to FIG. 4. The operations and variables of FIG. 4 correspond exactly to those of FIG. 2, except that after each incremental change of read current, the read current is briefly returned to the initial read current value $C_1$ that existed at the time $t_1$ the error was detected. The read current control exemplified by FIG. 4 varies the read current provided to the head magnetic film (MR film), with such variation being intense as compared to the variation of FIG. 2, which is particularly effective because the Barkhausen Noise as described above is caused by instability of the head magnetic field. As shown in FIG. 4, the read current is varied by being pulsed, and after the read current is decreased (the time period of $t_1$ to $t_2$) or increased (the time period of $t_3$ to $t_4$) from the value at the time $t_1$ or $t_3$ when the read error occurs over a range, the head performance is not deteriorated because such pulsing has reestablished stability of the head magnetic field; thereafter for continuation of normal read operations from $t_2$–$t_3$ and from $t_4$, the read current is returned to the initial read current value $C_1$ that existed at the time the read error was detected.

Figure 5:
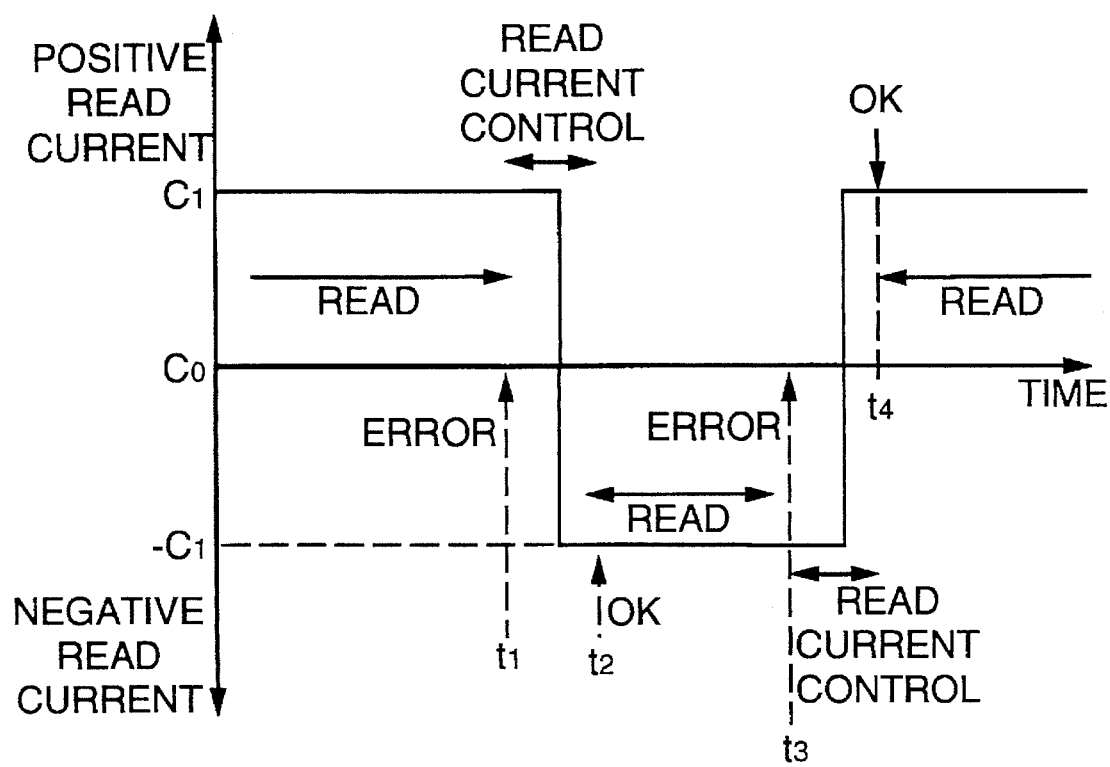
FIG. 5 is a diagram showing another example of read current control, wherein the read current is reversed in polarity upon detection of a read error, in an effort to relieve the read error.

As an alternative to the read current control examples of FIGS. 2 and 4, read current control may be conducted as in FIG. 5, wherein the variables for time and read current are the same as those shown previously. At time $t_1$ in FIG. 5 when the read current is $C_1$, the read error is detected. Steps 107, 109 change the read current from a positive value $C_1$ to a negative value $-C_1$ of identical amplitude but of different polarity. At time $t_2$ when the read error is determined to have been relieved, the read current is maintained at the negative polarity for further normal read operations until time $t_3$ when a new read error is detected, at which time the polarity is again reversed to reestablish the positive read current $C_1$, which in this case relieves the read error at time $t_4$.

As a fourth example of read current control providing by steps 107 and 109 of FIG. 1, the read current $C_1$ may be controlled by utilizing a phenomenon that the magnetic field occurring in the induction type of recording head extends to the magnetic film (MR film) of the magneto-resistance effect type of reproducing head disposed adjacent to the induction type of head. Therefore, a current that is too small for effecting a write-in operation on the recording medium may be passed through the induction type of recording head to affect the read current or magnetic field stability in the magnetic film (MR film) of the magneto-resistance effect type head under the read current control of steps 107, 109. The affect upon the read current in the MR film is not shown in the drawing for this fourth example of read current control wherein the state of the magnetic film of the magneto-resistance effect type of head before a single reproduction is varied by the magnetic field occurring in the induction type of head for recording when the read current control operation of steps 107 and 109 provide a pseudo write-in operation to the induction type of head during the time period $t_1$–$t_2$ and $t_3$–$t_4$. This fourth type of read current control operation may be the sole read current control of steps 107, 109 or conducted simultaneously with one, two or all three of the read current control operations having the effects illustrated in FIG. 2, FIG. 4 and FIG. 5.

Further, the read error relief processing of FIG. 1 may be such that steps 104–109 are repeated i+1 times for the control of FIG. 2, and then repeated for the control of FIG. 4, and then repeated for the control of FIG. 5, each with or without the control involving the simultaneous pseudo write-in operation for the induction type of head for recording, all according to the single embodiment of the present invention.

Figure 6:
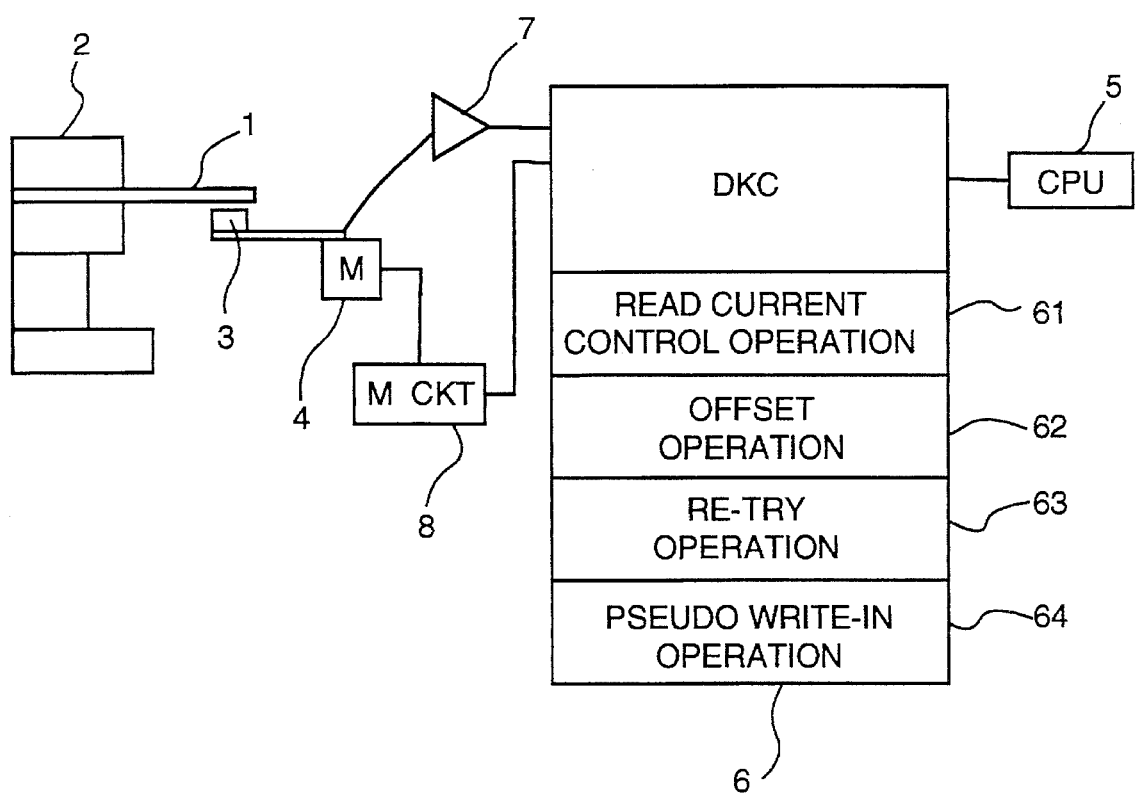
FIG. 6 shows the construction of a magnetic disk device having the read error relief that is conducted according to the flowchart of FIG. 1 and includes one or all of the read current control operations of FIGS. 2, 4 and 5.

The magnetic disk device of the present invention is structurally shown in FIG. 6. A magnetic disk 1, which may be of conventional type, is rotated on a spindle 2, in a known manner. The composite head 3 includes an induction type of magnetic head for recording a signal on the magnetic disk 1 and a magneto-resistance effect type of head for reproducing the signal from the magnetic disk 1, which composite head 3 is mounted on a slider that is positioned with respect to the magnetic disk 1 by a positioning mechanism or motor (M) 4, in a known manner under control of a motor circuit (M CKT). For the signal recording operation, a signal is transmitted from a central processing unit (CPU) 5 with recording instructions to the disk controller (DKC) 6, where the signal is then passed through a recording and reproducing amplifier circuit 7 in accordance with such instruction. Then the signal is converted to a current signal and then supplied to the recording induction type of head by the recording or reproducing amplifying circuit 7. This current signal induces a magnetic field in the induction type of head, which magnetic field thereby records the signal on the magnetic disk 1 through selectively inverting magnetization of the disk 1, in a known manner. For the signal reproducing operation, the magnetization information recorded on the magnetic disk 1 is converted to an electrical reproduced signal by the magneto-resistance effect type of head, and then the electrical signal is detected through the recording and reproducing amplifier circuit 7. When a read error occurs during step 101 of the above reproducing operation, on the basis of a judgment made by the DKC 6, the processing shown in FIG. 1 is executed. The disk controller 6 includes functions, which may be controlled by software or hardware or a combination of both software and hardware, which functions will control the operations of the same name as the functions, which are read current control operation 61, offset operation 62, re-try operation 63 and pseudo write-in operation 64. The offset operation 62 stored in the DKC is executed in steps 103 and/or 104 of FIG. 1 to instruct the positioning or motor control circuit (M CKT) 8 to offset the head 3 with respect to the track being read on the magnetic disk 1. Upon reception of this offset instruction, the positioning circuit 8 controls the positioning mechanism 4 to automatically repeat the offset operation for further iterations until the read margin is maximum, as explained with respect to FIG. 1. However, if the read error is not relieved even after the offset operation, the DKC will execute the read current control operation 61 stored in the DKC as step 107 upon a command of the CPU 5 to vary the read current in an effort to relieve the read error, as previously explained. The re-try operation 63 for steps 102, 104, the offset operation 62, the read current control operation 61 and the pseudo write-in operation 64 can be automatically carried out by a programmed microcomputer in the DKC 6 independently as a variation of the above of the CPU 5 to relieve the read error. According to the present invention, the read error due to the Barkhausen Noise or Base Line Shift phenomenon inherent to the magneto-resistance effective type of head can be relieved.

If the read error is not relieved even after conducting the read current control operation of steps 104–109 for i+1 times, the offset operation 62 of step 104 will have been conducted for m+1 times for each of the i times that read current control operation 61 was conducted in step 107, when offset is included in re-try step 104 although as stated it may occur only once in step 103.

In the actual magnetic disk device, plural composite heads will transduce plural magnetic disk surfaces respectively, and the read current can be independently controlled for each head during the read operation of the magnetic disk device.

As described in detail, when the read error due to Barkhausen Noise or Base Line Shift occurs, the therefore unstable magnetic domain structure of the head magnetic film is varied by varying the DC read current supply to the head magnetic film having the magneto-resistance effect and/or by varying a magnetic field from an adjacent head, so that the Barkhausen Noise and/or Base Line Shift can be extinguished by restoring stability to the magnetic domain structure of the head magnetic film and the occurrence of the read error relieved. Therefore, an improved reliability of the magnetic recording and reproducing device can be achieved.

In addition, a head whose performance has heretofore been considered failed due to the Barkhausen Noise or Base Line Shift and therefore would have been thrown away during manufacture, is now usable with the present invention. Therefore, the yield in the manufacturing of such heads is improved, and the magnetic recording and reproducing device can be obtained at low cost in accordance with the present invention.

While a preferred embodiment of the present invention has been described in detail, with variations and modifications, further embodiments, variations and modifications are contemplated within the broader aspects of the present invention, in addition to the advantageous details, in accordance with the spirit and scope of the following claims.

We claim:

1. A magnetic recording and reproducing device, comprising:

a composite head comprising an induction type of magnetic head for recording signals, and a magneto-resistance effect type of head for reproducing signals and having a magnetic film;

means for detecting a read error;

means responsive to the read error for varying a magnetic domain structure of the magnetic film during a re-try operation for relieving the read error; and wherein said means for varying conducts a pseudo write-in operation with the induction type of magnetic head to change the magnetic domain structure in the magnetic film through inductive coupling of a magnetic field.

2. A magnetic recording and reproducing device, comprising:

a composite head comprising an induction type of magnetic head for recording signals, and a magneto-resistance effect type of head for reproducing signals and having a magnetic film;

means for detecting a read error;

means responsive to the read error for varying a magnetic domain structure of the magnetic film during a re-try operation for relieving the read error; and wherein said means for varying changes a polarity of a read current while maintaining a value of the read current.

3. A magnetic data storage device, comprising:

a magneto-resistance effect type of head for reproducing signals from a magnetic medium and having a magnetic film;

a controller for controlling read current through said magnetic film during a read operation;

said controller having a read error relief operation for detecting a read error, changing the read current from an initial current value at the time of read error detection to a new value and re-trying the read Operation at the new value of read current;

wherein said controller controls the read error relief operation to successively change the read current from its previous new value and re-tries the read operation for a fixed plurality of iterations;

wherein said controller controls the read error relief operation to step wise increase or decrease read current with each iteration; and wherein said controller controls the read error relief operation to check for the occurrence of read error with each iteration and returns the read operation to normal read operation without read error relief operation when read error is not detected for one of the iterations.

4. The device of claim 3, wherein said controller controls the read error relief operation, for each iteration, to perform the plurality of iterations for each of a plurality of different head offsets.

5. The device of claim 3, wherein said controller controls the read error relief operation to return the read current to an initial value of the read current at a time of the read error being first detected, after the read error is relieved.

6. A magnetic data storage device, comprising:

a magneto-resistance effect type of head for reproducing signals from a magnetic medium and having a magnetic film;

a controller for controlling read current through said magnetic film during a read operation;

said controller having a read error relief operation for detecting a read error, changing the read current from an initial current value at the time of read error detection to a new value and re-trying the read operation at the new value of read current;

wherein said controller controls the read error relief operation to successively change the read current from its previous new value and re-tries the read operation for a fixed plurality of iterations; and wherein said controller controls the read error relief operation to step wise increase or decrease read current with each iteration.

7. The device of claim 6, wherein said controller controls the read error relief operation to return the read current to an initial current value between each iteration.

8. The device of claim 6, further including a rotatable magnetic disk having a plurality of tracks and wherein said controller is a disk controller.

9. A magnetic data storage device, comprising:

a magneto-resistance effect type of head for reproducing signals from a magnetic medium and having a magnetic film;

a controller for controlling read current through said magnetic film during a read operation;

said controller having a read error relief operation for detecting a read error, changing the read current from an initial current value at the time of read error detection to a new value and re-trying the read operation at the new value of read current; and wherein said controller controls the read error relief operation to maintain initial current value and changes polarity upon the detection of a read error.

10. A magnetic data storage device comprising:

a magneto-resistance effect type of head for reproducing signals from a magnetic medium and having a magnetic film;

a controller for controlling read current through said magnetic film during a read operation;

said controller having a read error relief operation for detecting a read error, changing the read current from an initial current value at the time of read error detection to a new value and re-trying the read operation at the new value of read current;

wherein said head is a composite head including an induction type of recording head; and wherein said controller controls the read error relief operation to conduct a pseudo write-in operation with respect to said induction type of recording head sufficiently to offset a magnetic domain structure in the magnetic film of the magneto-resistance effect type of head through induction coupling during the re-trying.

11. The device of claim 10, further including a rotatable magnetic disk having a plurality of tracks and wherein said controller is a disk controller.

12. A magnetic recording and reproducing method conducted with respect to a composite head comprising an induction type of magnetic head for recording signals, and a magneto-resistance effect type of head for reproducing signals and having a magnetic film, said method comprising:

detecting a read error;

instructing a re-try operation when a read error is detected;

in response to the read error, varying a magnetic domain structure of the magnetic film of said magneto-resistance effect type of head for the re-try operation a predetermined number of times for relieving the read error;

wherein said varying increases or decreases read current from a read current value at the time when the read error was detected; and wherein said varying returns the read current to a read current value at the time the read error was detected, after the read error is relieved.

13. A magnetic recording and reproducing method conducted with respect to a composite head comprising an induction type of magnetic head for recording signals, and a magneto-resistance effect type of head for reproducing signals and having a magnetic film, said method comprising:

detecting a read error;

instructing a re-try operation when a read error is detected;

in response to the read error, varying a magnetic domain structure of the magnetic film of said magneto-resistance effect type of head for the re-try operation a predetermined number of times for relieving the read error; and wherein said varying changes polarity of a read current while maintaining a value of the read current.

14. A magnetic recording and reproducing method conducted with respect to a composite head comprising an induction type of magnetic head for recording signals, and a magneto-resistance effect type of head for reproducing signals and having a magnetic film, said method comprising:

detecting a read error;

instructing a re-try operation when a read error is detected;

in response to the read error, varying a magnetic domain structure of the magnetic film of said magneto-resistance effect type of head for the re-try operation a predetermined number of times for relieving the read error; and wherein said varying conducts a pseudo write-in operation with the induction type of magnetic head to change the magnetic domain structure in the magnetic film through inductive coupling of a magnetic field.

15. A magnetic data storage method, comprising:

reproducing signals from a magnetic medium with a magneto-resistance effect type of head having a magnetic film for a read operation;

controlling current through the magnetic film during the read operation;

conducting a read error relief operation upon detecting a read error by changing the read current from an initial current value at the time of read error detection to a new value and re-trying the read operation at the new value of read current;

wherein said conducting a read error relief operation successively changes the read current from its previous new value and re-tries the read operation for a fixed plurality of iterations;

wherein said controller controls the read error relief operation to step wise increase or decrease read current with each iteration; and wherein said conducting a read error relief operation checks for read error with each iteration and returns the read operation to a normal read operation without the read error relief operation when read error is not detected for one of the iterations.

16. The method of claim 15, wherein said conducting a read error relief operation returns the read current to an initial current value at a time of the read error being first detected, after the read error is relieved.

17. A magnetic data storage method, comprising:

reproducing signals from a magnetic medium with a magneto-resistance effect type of head having a magnetic film for a read operation;

controlling current through the magnetic film during the read operation;

conducting a read error relief operation upon detecting a read error by changing the read current from an initial current value at the time of read error detection to a new value and re-trying the read operation at the new value of read current;

wherein said conducting a read error relief operation successively changes the read current from its previous new value and re-tries the read operation for a fixed plurality of iterations;

wherein said conducting a read error relief operation stepwise increases or decreases the read current with each iteration.

18. The method of claim 17, wherein said conducting a read error relief operation returns the read current to the initial current value between each iteration.

19. A magnetic data storage method, comprising:

reproducing signals from a magnetic medium with a magneto-resistance effect type of head having a magnetic film for a read operation;

controlling current through the magnetic film during the read operation;

conducting a read error relief operation upon detecting a read error by changing the read current from an initial current value at the time of read error detection to a new value and re-trying the read operation at the new value of read current; and wherein said conducting a read error relief operation maintains a current value and changes polarity of the read current.

20. A magnetic data storage method, comprising:

reproducing signals from a magnetic medium with a magneto-resistance effect type of head having a magnetic film for a read operation;

controlling current through the magnetic film during the read operation;

conducting a read error relief operation upon detecting a read error by changing the read current from an initial current value at the time of read error detection to a new value and re-trying the read operation at the new value of read current; and wherein said conducting a read error relief operation conducts a pseudo write-in operation with an induction type of recording head sufficiently to change a magnetic domain structure in the magnetic film of the magneto-resistance effect type of head through induction coupling during the re-try operation.

* * * * *